US010755100B2

(12) United States Patent
Komiyama

(10) Patent No.: US 10,755,100 B2
(45) Date of Patent: Aug. 25, 2020

(54) INFORMATION PROCESSING DEVICE, SYSTEM, INFORMATION PROCESSING METHOD, AND STORAGE MEDIUM

(71) Applicant: NS Solutions Corporation, Tokyo (JP)

(72) Inventor: Masakazu Komiyama, Tokyo (JP)

(73) Assignee: NS SOLUTIONS CORPORATION, Tokyo (JP)

( * ) Notice: Subject to any disclaimer, the term of this patent is extended or adjusted under 35 U.S.C. 154(b) by 0 days.

(21) Appl. No.: 16/335,145

(22) PCT Filed: Dec. 22, 2017

(86) PCT No.: PCT/JP2017/046219
§ 371 (c)(1),
(2) Date: Mar. 20, 2019

(87) PCT Pub. No.: WO2018/123900
PCT Pub. Date: Jul. 5, 2018

(65) Prior Publication Data
US 2019/0278996 A1 Sep. 12, 2019

(30) Foreign Application Priority Data
Dec. 26, 2016 (JP) .................................. 2016-250731

(51) Int. Cl.
G06K 9/00 (2006.01)
G06K 7/14 (2006.01)
G06K 9/62 (2006.01)

(52) U.S. Cl.
CPC ........... *G06K 9/00671* (2013.01); *G06K 7/14* (2013.01); *G06K 7/1417* (2013.01); *G06K 7/1443* (2013.01); *G06K 9/6262* (2013.01)

(58) Field of Classification Search
None
See application file for complete search history.

(56) References Cited

U.S. PATENT DOCUMENTS 9,256,775 B1 * 2/2016 Yasunaga ............ G06K 7/1443
10,026,228 B2 * 7/2018 Yuen .................... G06T 19/20
(Continued)

FOREIGN PATENT DOCUMENTS

JP 2006-277315 A 10/2006
JP 2009-187209 A 8/2009
(Continued)

OTHER PUBLICATIONS

International Preliminary Report on Patentability issued from the International Bureau in counterpart International Application No. PCT/JP2017/046219, dated Jul. 11, 2019.
(Continued)

*Primary Examiner* — Anand P Bhatnagar
(74) *Attorney, Agent, or Firm* — Arent Fox LLP

(57) ABSTRACT

An information processing device of the present invention includes a first acquirer, a second acquirer, an analyzer, and a creating unit. The first acquirer is configured to acquire a plurality of images in which a working environment is photographed. The second acquirer is configured to acquire a plurality of setting patterns including analysis setting values. The analysis setting values are setting values regarding an analysis of markers photographed in the images. The analyzer is configured to analyze the markers from the respective images acquired by the first acquirer based on the analysis setting values. The analysis setting values are included in the plurality of respective setting patterns acquired by the second acquirer. The creating unit is configured to create total information for each of the setting patterns. The total information is based on an analysis process of the markers corresponding to the setting patterns by the analyzer.

14 Claims, 15 Drawing Sheets

(56) References Cited

U.S. PATENT DOCUMENTS

| | | | | |
|---|---|---|---|---|
| 2008/0267450 | A1* | 10/2008 | Sugimoto | A63H 17/395 |
| | | | | 382/103 |
| 2010/0020221 | A1* | 1/2010 | Tupman | G06F 3/04883 |
| | | | | 348/333.01 |
| 2014/0340513 | A1* | 11/2014 | Nagata | H04N 7/18 |
| | | | | 348/143 |
| 2015/0034725 | A1* | 2/2015 | Tazoe | G06K 7/10465 |
| | | | | 235/462.09 |
| 2015/0153172 | A1* | 6/2015 | Starns | G01C 11/02 |
| | | | | 382/106 |
| 2015/0339508 | A1 | 11/2015 | Hosokane | |
| 2017/0213377 | A1* | 7/2017 | Torii | G06T 11/00 |
| 2018/0350150 | A1* | 12/2018 | Powderly | G02B 27/017 |
| 2019/0102608 | A1* | 4/2019 | Wang | G06K 9/00906 |
| 2019/0244388 | A1* | 8/2019 | Inazumi | B25J 9/1697 |
| 2019/0313017 | A1* | 10/2019 | Ikeda | H04N 5/23222 |
| 2020/0034624 | A1* | 1/2020 | Sharma | G06T 15/005 |

FOREIGN PATENT DOCUMENTS

| | | |
|---|---|---|
| JP | 2010-122770 A | 8/2010 |
| JP | 2010-211738 A | 9/2010 |
| JP | 2015-084139 A | 4/2015 |
| JP | 5908113 B2 | 4/2016 |

OTHER PUBLICATIONS

Decision to Grant a Patent dated Jan. 29, 2019, from the Japanese Patent Office in counterpart application No. 2016-250731.
International Search Report and Written Opinion, issued by International Searching Authority in corresponding International Application No. PCT/JP2017/046219, dated Mar. 20, 2018, (PCT/ISA/210 & PCT/ISA/237).

* cited by examiner

| SETTING PATTERN NAME | FIRST ANALYSIS SETTING ITEM | SECOND ANALYSIS SETTING ITEM | ... | M-TH ANALYSIS SETTING ITEM |
|---|---|---|---|---|
| FIRST SETTING PATTERN | | | ... | |
| SECOND SETTING PATTERN | | | ... | |
| : | : | : | : | : |
| N-TH SETTING PATTERN | | | ... | |

| SETTING PATTERN NAME | TOTAL INFORMATION ||
|---|---|---|
| | TOTAL RECOGNITION COUNT | TOTAL PROCESSING TIME (SECOND) |
| FIRST SETTING PATTERN | 17797 | 2048.7 |
| SECOND SETTING PATTERN | 10389 | 1165.3 |
| : | : | : |
| N-TH SETTING PATTERN | 6104 | 748.9 |

FIG.9

| IMAGE | RECOGNITION COUNT | | | |
|---|---|---|---|---|
| | FIRST SETTING PATTERN | SECOND SETTING PATTERN | ... | N-TH SETTING PATTERN |
| FIRST IMAGE | 3 | 2 | ... | 1 |
| SECOND IMAGE | 3 | 3 | ... | 1 |
| ⋮ | ⋮ | ⋮ | ⋮ | ⋮ |
| L-TH IMAGE | 4 | 3 | ... | 1 |
| TOTAL RECOGNITION COUNT | 17797 | 10389 | ... | 6104 |

FIG.10

| IMAGE | PROCESSING TIME (SECOND) | | | |
|---|---|---|---|---|
| | FIRST SETTING PATTERN | SECOND SETTING PATTERN | ... | N-TH SETTING PATTERN |
| FIRST IMAGE | 0.0052 | 0.0042 | ... | 0.0022 |
| SECOND IMAGE | 0.0053 | 0.0042 | ... | 0.0021 |
| ⋮ | ⋮ | ⋮ | ⋮ | ⋮ |
| L-TH IMAGE | 0.0052 | 0.0042 | ... | 0.0021 |
| TOTAL PROCESSING TIME | 2048.7 | 1165.3 | ... | 748.9 |

FIG.14

| IMAGE | MARKER | | | |
|---|---|---|---|---|
| | FIRST MARKER (1.5) | SECOND MARKER (1.1) | ... | 500-TH MARKER (0.7) |
| FIRST IMAGE | GOOD | GOOD | ... | POOR |
| SECOND IMAGE | POOR | GOOD | ... | POOR |
| ⋮ | ⋮ | ⋮ | ⋮ | ⋮ |
| L-TH IMAGE | POOR | POOR | ... | GOOD |
| TOTAL WEIGHTING VALUE | 18 | 12.1 | ... | 2.1 |

INFORMATION PROCESSING DEVICE, SYSTEM, INFORMATION PROCESSING METHOD, AND STORAGE MEDIUM

CROSS-REFERENCE TO RELATED APPLICATIONS

The present application is a National Stage entry of International Application No. PCT/JP20171046219, filed Dec. 22, 2017, which claims priority to Japanese Patent Application No. 2016-260731, filed Dec. 26, 2016. The disclosures of the prior applications are incorporated by reference in their entirety.

TECHNICAL FIELD

The present invention relates to an information processing device, a system, an information processing method, and a storage medium.

BACKGROUND ART

There have been conventionally known techniques regarding analysis of markers photographed in an image as disclosed in Patent Literature 1 and Patent Literature 2.

CITATION LIST

Patent Literature

Patent Literature 1: Japanese Laid-open Patent Publication No. 2010-122770
Patent Literature 2: Japanese Patent No. 5908113

SUMMARY OF INVENTION

Technical Problem

For a process of analyzing the markers photographed in the image, setting values of software and the like usually need to be predetermined.

However, the setting values appropriate for the analysis of the markers differ depending on an object of analyzing the markers, an environment where the image is photographed, sizes of the photographed markers, and similar condition. Furthermore, usually, there are a plurality of setting items. Under such situation, adjusting the setting values by an operator and determining the appropriate setting values are extremely complicated works.

Solution to Problem

An information processing device of the present invention includes a first acquirer, a second acquirer, an analyzer, and a creating unit. The first acquirer is configured to acquire a plurality of images in which a working environment is photographed. The second acquirer is configured to acquire a plurality of setting patterns including analysis setting values. The analysis setting values are setting values regarding an analysis of markers photographed in the images. The analyzer is configured to analyze the markers from the respective images acquired by the first acquirer based on the analysis setting values. The analysis setting values are included in the plurality of respective setting patterns acquired by the second acquirer. The creating unit is configured to create total information for each of the setting patterns. The total information is based on an analysis process of the markers corresponding to the setting patterns by the analyzer.

Advantageous Effects of Invention

According to the present invention, determination of the appropriate setting values can be simplified.

BRIEF DESCRIPTION OF DRAWINGS

FIG. 9 is a drawing describing a determination method for a total recognition count.
FIG. 10 is a drawing describing a determination method for total processing time.
FIG. 14 is a drawing describing a determination method for a weighting evaluation value of a first setting pattern.

DESCRIPTION OF EMBODIMENTS

First Embodiment

[Warehouse and the Like]

Figure 1:
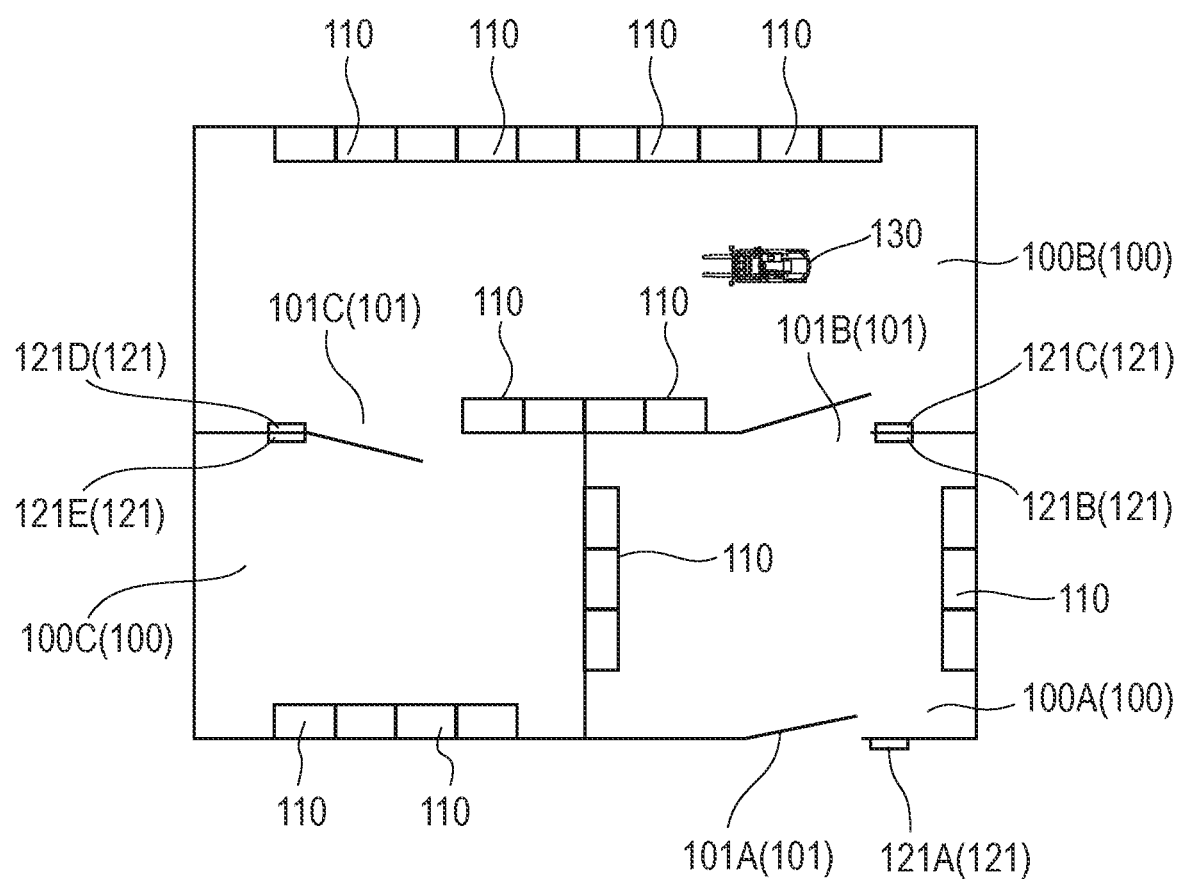
FIG. 1 is a drawing illustrating one example of a warehouse.

An image processing system 1 of this embodiment is a system regarding analysis of markers 120 used for a working environment such as a warehouse 100. First, the following describes the warehouse 100 as one example of the working environment with reference to FIG. 1. FIG. 1 is a drawing illustrating one example of the warehouse 100 and a plan view of the warehouse 100.

In this embodiment, the warehouse 100 is a first warehouse 100A, a second warehouse 100B, or a third warehouse 100C. The warehouses 100 each have a doorway 101. The first warehouse 100A has a first doorway 101A and a second doorway 101B. The second warehouse 100B has the second doorway 101B and a third doorway 101C. The third warehouse 100C has the third doorway 101C. The first doorway 101A communicates between the outside and the first warehouse 100A. The second doorway 101B communicates between the first warehouse 100A and the second warehouse 100B. The third doorway 101C communicates between the second warehouse 100B and the third warehouse 100C.

In the warehouse 100, a fork-lift truck 130 as one example of a moving body movable inside the working environment is located to perform various works such as a conveyance of an article 115 in the warehouse 100. The fork-lift truck 130 can move between the warehouses 100 through the doorways 101.

Figure 2A:
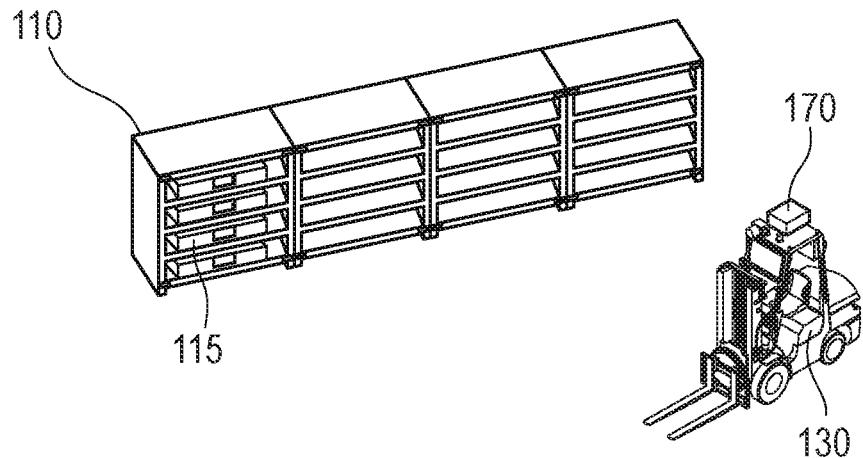
FIG. 2A is a perspective view illustrating one example of a shelf.
Figure 2B:
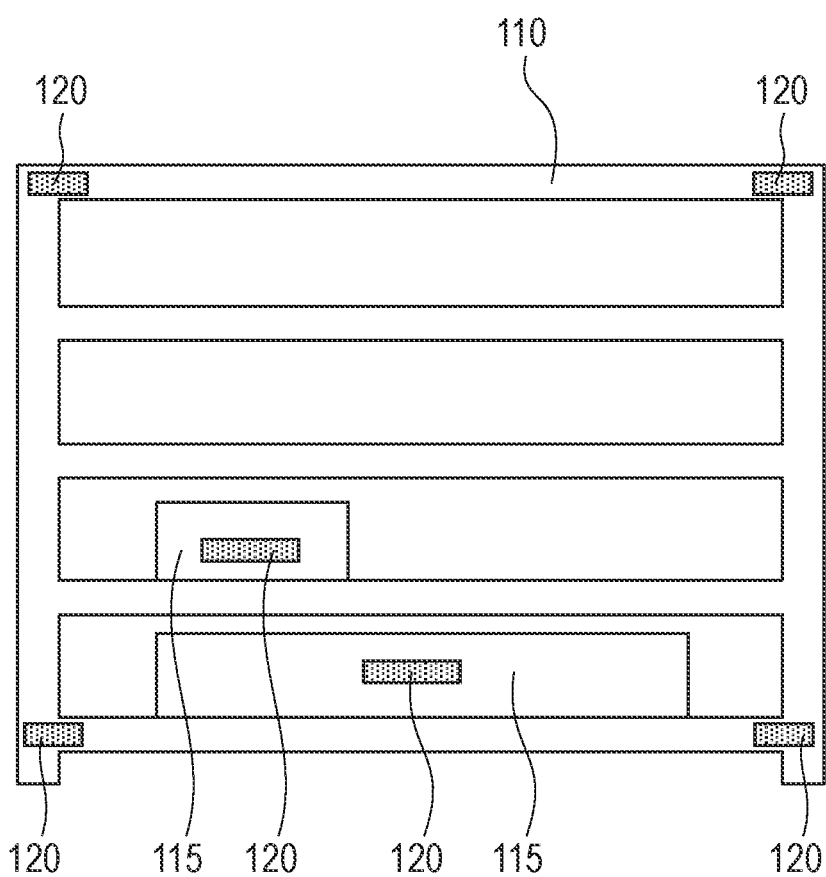
FIG. 2B is a front view illustrating one example of the shelf.

A shelf 110 is located in each warehouse 100. The following describes the shelf 110 with reference to FIG. 2A and FIG. 2B. FIG. 2A is a perspective view illustrating one example of the shelf 110. FIG. 2B is a front view illustrating one example of the shelf 110. As illustrated in FIG. 2A and FIG. 2B, the articles 115 can be located in the shelf 110. The fork-lift truck 130 can place the article 115 in the shelf 110 and take out the article 115 from the shelf 110.

As illustrated in FIG. 2B, markers 120 are attached to the shelf 110 and the articles 115. The marker 120 is an optically readable code that records predetermined information. For example, while color bits (registered trademark), a two-dimensional code such as a QR code (registered trademark), and a barcode is used as the marker 120, another code may be used as the marker 120. In the marker 120, an identification ID of the shelf 110, information with which the shelf 110 to which the marker 120 is attached can be identified, an identification ID of the article 115, information with which the article 115 to which the marker 120 is attached can be identified, and similar information are recorded.

As illustrated in FIG. 1, a warehouse marker 121 as a marker to identify the warehouse 100 ahead of the doorway 101 is attached to the vicinity of the doorway 101 of the warehouse 100. A first warehouse marker 121A that records information indicative of the first warehouse 100A is attached to the outside near the first doorway 101A. A second warehouse marker 121B that records information indicative of the second warehouse 100B is attached to the first warehouse 100A side near the second doorway 101B. A third warehouse marker 121C that records information indicative of the first warehouse 100A is attached to the second warehouse 100B side near the second doorway 101B. A fourth warehouse marker 121D that records information indicative of the third warehouse 100C is attached to the second warehouse 100B side near the third doorway 101C. A fifth warehouse marker 121E that records information indicative of the second warehouse 100B is attached to the third warehouse 100C side near the third doorway 101C.

An information processing terminal 170 mounted to the fork-lift truck 130 analyzes the warehouse marker 121 when the fork-lift truck 130 comes in and out the warehouse 100 through the doorway 101 to ensure identifying the warehouse 100 in which the fork-lift truck 130 is present.

[Image Processing System]

Figure 3:
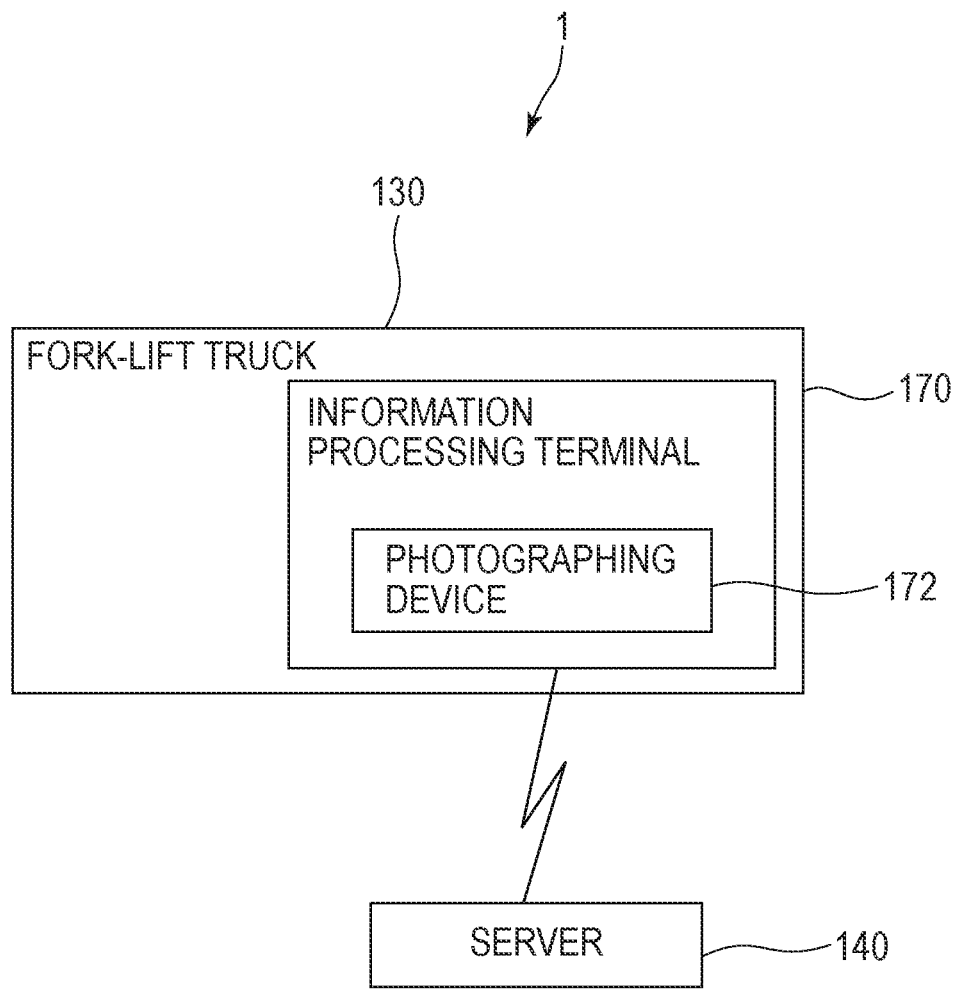
FIG. 3 is a drawing illustrating one example of a configuration of an image processing system.

Next, the following describes a configuration of the image processing system 1 with reference to FIG. 3. The image processing system 1 includes the already-described fork-lift truck 130, a server 140, and the information processing terminal 170. The server 140 and the information processing terminal 170 can communicated with one another via a communication network such as a wireless LAN.

As illustrated in FIG. 2A, the information processing terminal 170 is mounted to the fork-lift truck 130, moves together with the fork-lift truck 130, and photographs the inside of the warehouse 100 with a photographing device 172 described later. Since the markers 120 are attached to the shelf 110 and the articles 115 in the warehouse 100 as described above, the markers 120 are photographed in an image photographed by the information processing terminal 170.

Figure 4A:
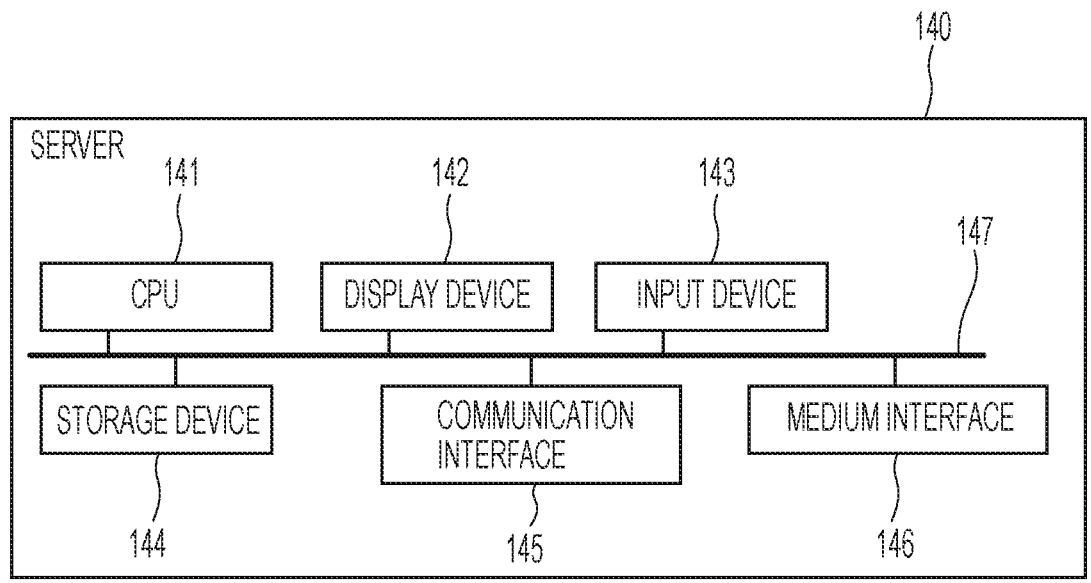
FIG. 4A is a drawing illustrating one example of a hardware configuration of a server.

Next, the following describes a hardware configuration of the server 140 as an information processing device with reference to FIG. 4A. FIG. 4A is a drawing illustrating one example of the hardware configuration of the server 140. The server 140 includes a CPU 141, a display device 142, an input device 143, a storage device 144, a communication interface 145, a medium interface 146, and a bus 147 that couples these devices together.

The CPU 141 controls the entire server 140. Execution of processes based on programs stored in the storage device 144 and similar device by the CPU 141 achieves a software configuration of the server 140 and processes of the server 140 illustrated in FIG. 7 and FIG. 8 described later.

The display device 142 is an LCD monitor or similar device that can display the image.

The input device 143 is a touchscreen, a computer mouse, a keyboard, or similar device that receives an instruction from, for example, an operator.

The storage device 144 is a storage device such as a RAM, a ROM, and an HDD that stores the programs and stores data and the like used for execution of the process based on the program by the CPU 141. The storage device 144 is one example of a storage medium.

The communication interface 145 manages control of communications between the server 140 and an external device such as the information processing terminal 170.

The medium interface 146 is an interface with a recording medium that can be coupled to the server 140. For example, while an SD memory card is used as the recording medium, the recording medium is not limited to the SD memory card.

Figure 5A:
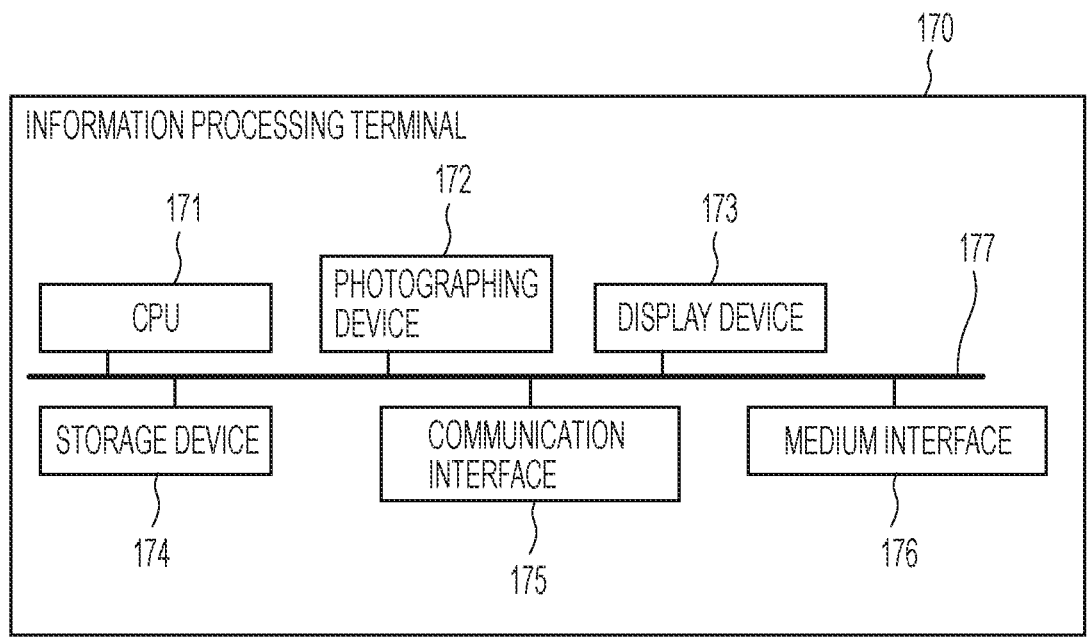
FIG. 5A is a drawing illustrating one example of a hardware configuration of an information processing terminal.

Next, the following describes a hardware configuration of the information processing terminal 170 as an information processing device with reference to FIG. 5A. FIG. 5A is a drawing illustrating one example of the hardware configuration of the information processing terminal 170. The information processing terminal 170 includes a CPU 171, the photographing device 172, a display device 173, a storage device 174, a communication interface 175, a medium interface 176, and a bus 177 that couples these devices together.

The CPU 171 controls the entire information processing terminal 170. Execution of processes based on programs stored in the storage device 174 and similar device by the CPU 171 achieves a software configuration of the information processing terminal 170 and processes of the information processing terminal 170 illustrated in FIG. 12 described later.

The photographing device 172 photographs the image. The photographing device 172 includes a lens, an imaging device, and similar device.

The display device 173 is an LCD monitor or similar device that can display the image.

The storage device 174 is a storage device such as a RAM, a ROM, and an HDD that stores the programs and stores data and the like used for execution of the process based on the program by the CPU 171. The storage device 174 is one example of a storage medium.

The communication interface 175 manages control of communications between the information processing terminal 170 and an external device such as the server 140.

The medium interface 176 is an interface with a recording medium that can be coupled to the information processing terminal 170. For example, while an SD memory card is used as the recording medium, the recording medium is not limited to the SD memory card.

Figure 6:
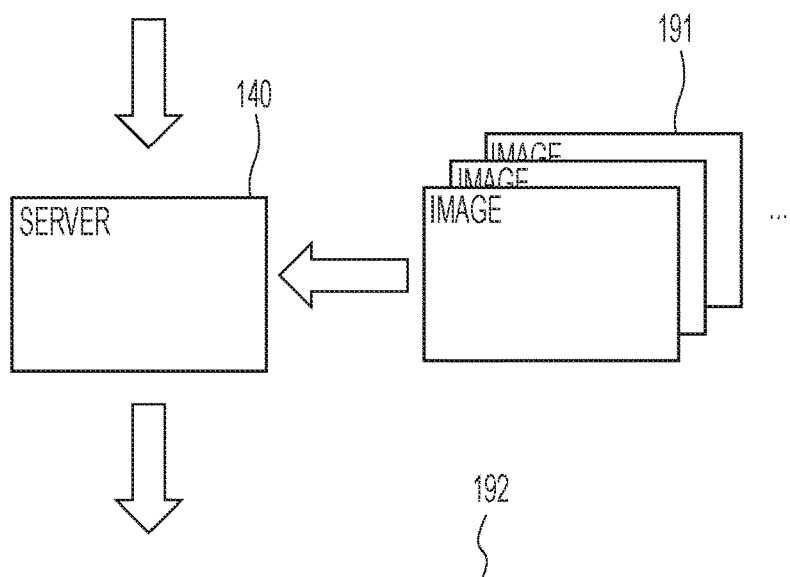
FIG. 6 is a conceptual diagram of a process that creates a total information list of a first embodiment.

Next, the following describes an outline of a process that creates a total information list 192 executed by the image processing system 1 with reference to FIG. 6. FIG. 6 is a conceptual diagram of the process that creates the total information list 192.

The information processing terminal 170 is mounted to the fork-lift truck 130, moves together with the fork-lift truck 130, and can photograph the inside of the warehouse 100 with the photographing device 172 described later.

Prior to the actual work by the fork-lift truck 130 in the warehouse 100, the information processing terminal 170 first moves together with the fork-lift truck 130 and photographs the inside of the warehouse 100. The server 140 creates the total information list 192 based on images 191 in the warehouse 100 photographed by the information processing terminal 170 and a preliminarily prepared setting pattern list 190. The server 140 determines an appropriate setting pattern of the warehouse 100 based on the total information list 192. The appropriate setting pattern becomes appropriate setting values when the markers 120 are analyzed from the images in which the inside of the warehouse 100 is photographed.

In the actual work in the warehouse 100 using the fork-lift truck 130, the information processing terminal 170 analyzes the markers 120 from the photographed images based on the setting pattern determined by the server 140.

Next, the following describes the setting pattern list 190 with reference to FIG. 6. The setting pattern list 190 is, for example, information preliminarily stored in the storage device 144 in the server 140 and includes a plurality of setting patterns from a first setting pattern to N-th setting pattern (N is a natural number equal to or more than two).

The setting patterns each include analysis setting values from the first analysis setting value to the M-th analysis setting value (M is a natural number equal to or more than two). While the setting pattern includes the plurality of analysis setting values in this embodiment, the setting pattern may include only one analysis setting value. The respective first analysis setting value to M-th analysis setting value are setting values corresponding to the first analysis setting item to the M-th analysis setting item.

The analysis setting value is a setting value regarding the analysis of the marker 120 photographed in the image. A first analyzing unit 152 described later in the server 140 analyzes the markers 120 from the images based on the analysis setting values. Even with the identical image, when the analysis setting value is different, the first analyzing unit 152 increases or decreases the number of analyzed markers 120 and the number of markers 120 falsely recognized and increases or decreases the processing time taken for the analysis process of the markers 120.

The first analyzing unit 152 needs not to analyze the markers 120 from the images based on all analysis setting values. The first analyzing unit 152 analyzes the marker 120 from the image based on the analysis setting values corresponding to the type of the analyzed marker 120. The type of the marker 120 includes, for example, the above-described color bits, QR code, and barcode. To analyze the color bits from the image, the first analyzing unit 152 uses, for example, from the first analysis setting value to the ninth analysis setting value. To analyze the QR code from the image, the first analyzing unit 152 uses, for example, from the tenth analysis setting value to the fifteenth analysis setting value.

Any given two setting patterns from the first setting pattern to the N-th setting pattern differ in at least one analysis setting value. Accordingly, the setting pattern list 190 does not include a plurality of setting patterns in which all analysis setting values are identical.

Next, the following describes the total information list 192 with reference to FIG. 6. The total information list 192 is a list of the total information for each setting pattern. The total information is information created for each setting pattern and information based on the analysis process of the marker 120 corresponding to the setting pattern by the first analyzing unit 152 in the server 140. More specifically, the analysis process of the markers 120 corresponding to the setting patterns by the first analyzing unit 152 is the analysis process of the markers 120 from the respective images 191 by the first analyzing unit 152 based on the analysis setting values included in the setting patterns.

The total information of each setting pattern includes a total recognition count and a total processing time. The total recognition count is the total count of the markers 120 analyzed by the analysis process of the marker 120 corresponding to the setting pattern. The total processing time is a sum of the processing time of the analysis process of the marker 120 corresponding to the setting pattern. Details of methods for calculating the total recognition count and the total processing time will be described later.

Figure 4B:
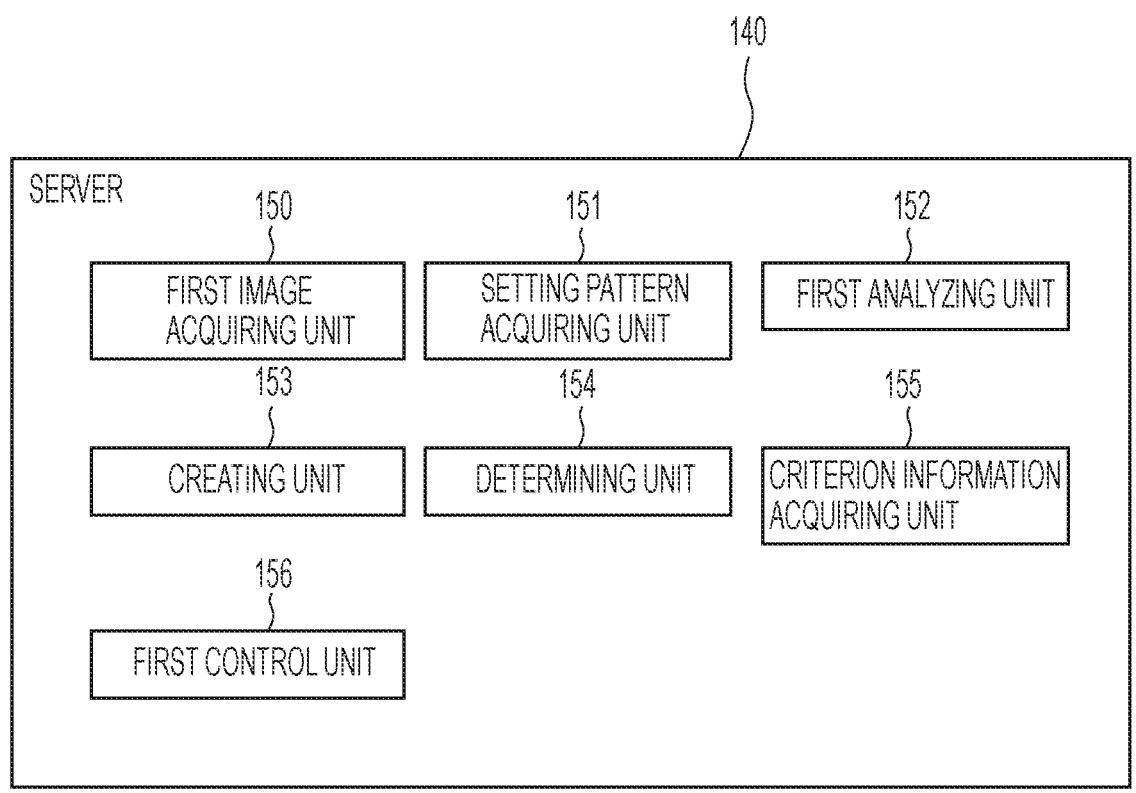
FIG. 4B is a drawing illustrating one example of a software configuration of the server.

Next, the following describes a software configuration achieving the functions of the server 140 with reference to FIG. 4B. FIG. 4B is a drawing illustrating one example of the software configuration of the server 140. The server 140 includes a first image acquiring unit 150, a setting pattern acquiring unit 151, the first analyzing unit 152, a creating unit 153, a determining unit 154, a criterion information acquiring unit 155, and a first control unit 156.

The first image acquiring unit 150 acquires the plurality of images in which the warehouse 100 is photographed.

The setting pattern acquiring unit 151 acquires the setting pattern list 190.

The first analyzing unit 152 analyzes the markers 120 from the respective images acquired by the first image acquiring unit 150 based on the analysis setting values included in the respective setting patterns in the setting pattern list 190.

The creating unit 153 creates the total information based on the analysis process of the markers 120 corresponding to the setting patterns by the first analyzing unit 152 for each setting pattern.

The determining unit 154 determines the setting pattern applied to the warehouse 100 based on the total information created by the creating unit 153.

The criterion information acquiring unit 155 acquires criterion information indicative of adoption criteria of the setting pattern of the warehouse 100. Details of the criterion information will be described later.

The first control unit 156 executes various controls.

Figure 5B:
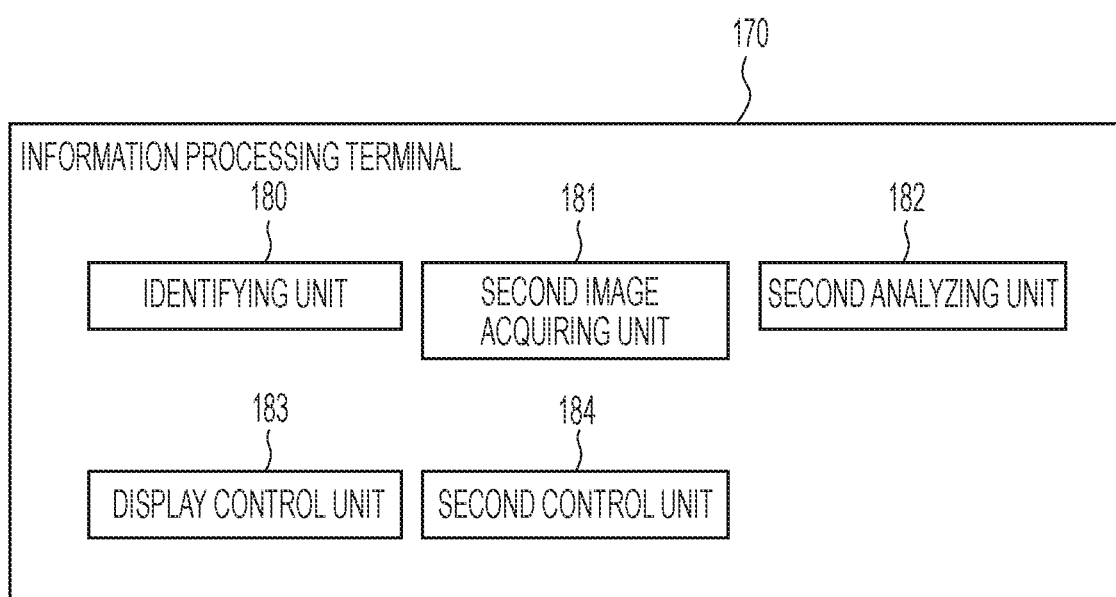
FIG. 5B is a drawing illustrating one example of a software configuration of the information processing terminal.

Next, the following describes a software configuration achieving the functions of the information processing terminal 170 with reference to FIG. 5B. FIG. 5B is a drawing illustrating one example of the software configuration of the information processing terminal 170. The information processing terminal 170 includes an identifying unit 180, a second image acquiring unit 181, a second analyzing unit 182, a display control unit 183, and a second control unit 184.

The identifying unit 180 identifies the warehouse 100 in which the fork-lift truck 130 is located.

The second image acquiring unit 181 acquires the image photographed by the photographing device 172 in the information processing terminal 170.

The second analyzing unit 182 analyzes the markers 120 from the images photographed by the photographing device 172 based on the analysis setting values included in the setting pattern determined by the determining unit 154 of the warehouse 100 identified by the identifying unit 180. The second analyzing unit 182 has a function similar to that of the first analyzing unit 152 in the server 140. The second analyzing unit 182 may be identical to the first analyzing unit 152 as software.

The display control unit 183 executes control to cause the display device 173 in the information processing terminal 170 to display an analysis screen 193 described later.

The second control unit 184 executes various controls.

[Setting Pattern Determination Process]

Figure 7:
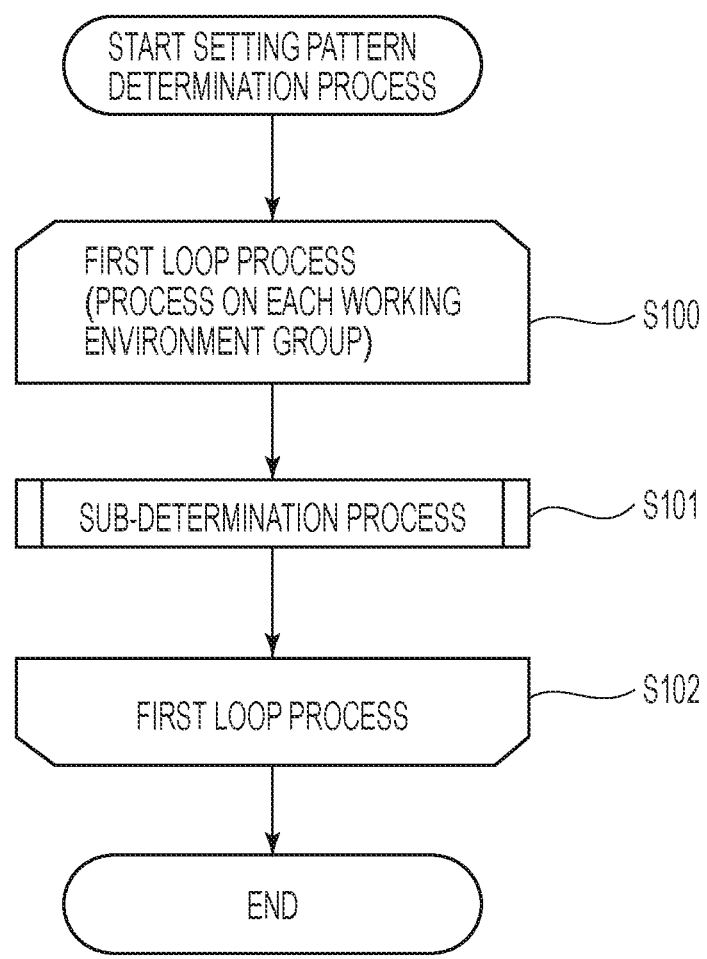
FIG. 7 is a flowchart of a setting pattern determining process of the first embodiment.

Next, the following describes the setting pattern determination process with reference to FIG. 7. FIG. 7 is a flowchart of the setting pattern determination process. The setting pattern determination process is a process executed prior to the actual work by the fork-lift truck 130 in the warehouse 100 and a process that determines the appropriate setting pattern of the warehouse 100. The server 140 executes the setting pattern determination process.

At S100, the first control unit 156 executes a start process of the first loop process. The first loop process is a process from S100 to S102. The first control unit 156 executes the following process as the start process of the first loop process. That is, in the case where there are working environment groups not set as process target groups among the working environment groups in the first loop process, the first control unit 156 sets one of the working environment groups not set as the process target group in the first loop process as the process target group. In the case where there are no working environment groups not set as the process target groups among the working environment groups in the first loop process, the first control unit 156 terminates the first loop process. As apparent from FIG. 7, the termination of the first loop process terminates the setting pattern determination process.

Here, the following describes the working environment group. The working environment group is a collection of the warehouses 100 as one example of the working environment. The warehouse 100 is preliminarily classified into any of the working environment groups by predetermined classification criteria. For example, the first warehouse 100A and the third warehouse C belong to the first working environment group and the second warehouse B belongs to the second working environment group.

The classification criteria are determined such that the environments of the warehouses 100 belonging to the identical working environment group become similar. For example, the classification criteria are determined based on brightness of the warehouse 100 and the type of the markers 120 used in the warehouse 100. More specifically, the warehouses 100 meeting conditions that a difference in brightness is within a predetermined range and the types of the markers 120 are identical are determined as belonging to the identical working environment group. The classification criteria may be a criterion other than the criteria described here.

At S101, the sub-determination process is executed. The sub-determination process will be described next.

At S102, the first control unit 156 executes a termination process of the first loop process. The first control unit 156 returns the process to S100 as the termination process of the first loop process.

Figure 8:
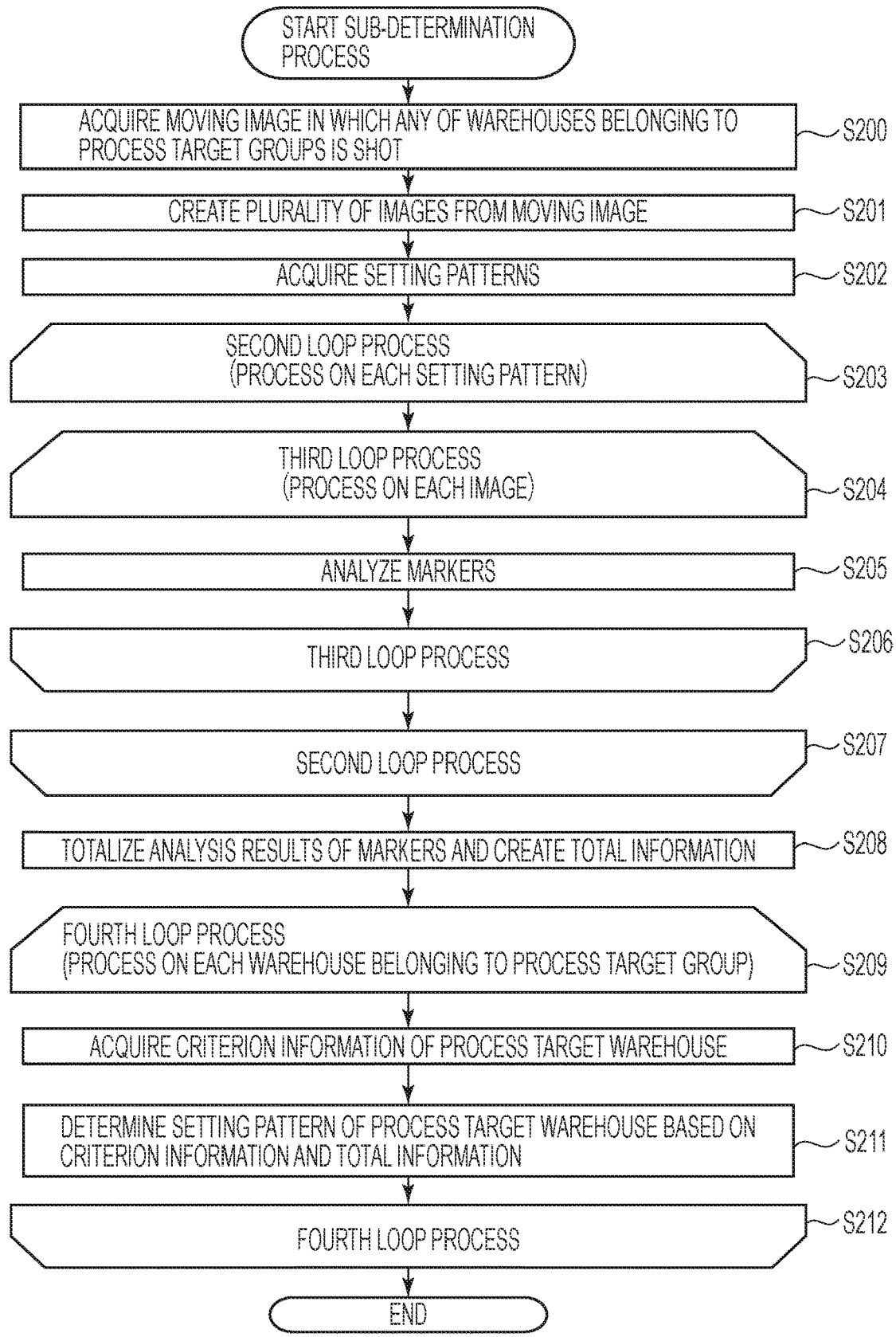
FIG. 8 is a flowchart of a sub-determination process of the first embodiment.

Next, the following describes the sub-determination process with reference to FIG. 8. FIG. 8 is a flowchart of the sub-determination process.

At S200, the first image acquiring unit 150 acquires a moving image in which any of the warehouses 100 belonging to the process target groups is shot. The first image acquiring unit 150 may acquire the moving image in which the warehouse 100 is shot from the information processing terminal 170 moving together with the fork-lift truck 130 via the communication network. The moving image in which the warehouse 100 is shot by the information processing terminal 170 may be acquired via a recording medium where the moving image in which the warehouse 100 is shot is recorded.

At S201, the first image acquiring unit 150 creates a plurality of images from the moving image acquired at S200. The images created here are still images. The images created at S201 are images of respective frames of the moving image shot by the photographing device 172 in the information processing terminal 170 and the images photographed by the photographing device 172 in the information processing terminal 170.

At S202, the setting pattern acquiring unit 151 acquires the plurality of setting patterns included in the setting pattern list 190 by acquiring the setting pattern list 190. While the setting pattern acquiring unit 151 acquires the setting pattern list 190 from the storage device 144 in the server 140, the setting pattern list 190 may be acquired from an external information processing device via a network.

At S203, the first control unit 156 executes a start process of the second loop process. The second loop process is a process from S203 to S207. The first control unit 156 executes the following process as the start process of the second loop process. That is, in the case where there are the setting patterns not set as process target setting patterns in the second loop process among the plurality of setting patterns acquired at S202, the first control unit 156 sets one of the setting patterns not set as the process target setting pattern as the process target setting pattern in the second loop process. In the case where there are no setting patterns not set as the process target setting patterns in the second loop process among the plurality of setting patterns acquired at S202, the first control unit 156 terminates the second loop process and advances the process to S208.

At S204, the first control unit 156 executes a start process of the third loop process. The third loop process is a process from S204 to S206. The first control unit 156 executes the following process as the start process of the third loop process. That is, in the case where there are images not set as process target images in the third loop process at this time among the plurality of images created at S201, the first control unit 156 sets one of the images not set as the process target image as the process target image in the third loop process. In the case where there are no images not set as the process target images in the third loop process at this time among the plurality of images created at S201, the first control unit 156 terminates the third loop process and advances the process to S207.

At S205, the first analyzing unit 152 analyzes the markers 120 from the process target images based on the analysis setting values included in the process target setting patterns.

At this time, the first analyzing unit 152 causes the storage device 144 in the server 140 to store the number of analyzed markers 120 and the processing time of the analysis process of the markers 120.

At S206, the first control unit 156 executes a termination process of the third loop process. The first control unit 156 returns the process to S204 as the termination process of the third loop process.

At S207, the first control unit 156 executes a termination process of the second loop process. The first control unit 156 returns the process to S203 as the termination process of the second loop process.

At S208, the creating unit 153 totalizes the analysis results of the markers 120 by the first analyzing unit 152 and creates the total information list 192. As described with reference to FIG. 6, the total information list 192 is the list of the total information for each setting pattern. The total information includes the total recognition count and the total processing time.

First, the following describes the determination method for the total recognition count of the first setting pattern with reference to FIG. 9. FIG. 9 is a drawing describing the determination method for the total recognition count. The first image to the L-th image (L is a natural number equal to or more than two) in FIG. 9 are the images created at S201.

The creating unit 153 determines the total count of the number of markers 120 analyzed from the respective first image to the L-th image based on the analysis setting values included in the first setting pattern by the first analyzing unit 152 as the total recognition count of the first setting pattern.

Similarly, the creating unit 153 determines the total recognition counts of the respective setting patterns from the second setting pattern to the N-th setting pattern.

Next, the following describes the determination method for the total processing time of the first setting pattern with reference to FIG. 10. FIG. 10 is a drawing describing the determination method for the total processing time. Similarly to FIG. 9, the first image to the L-th image in FIG. 10 are the images created at S201.

The creating unit 153 determines the sum of the analysis processing times of the markers 120 from the respective first image to L-th image based on the analysis setting values included in the first setting pattern by the first analyzing unit 152 as the total processing time of the first setting pattern.

Similarly, the creating unit 153 determines the total processing times of the respective setting patterns from the second setting pattern to the N-th setting pattern.

At S209, the first control unit 156 executes a start process of the fourth loop process. The fourth loop process is a process from S209 to S212. The first control unit 156 executes the following process as the start process of the fourth loop process. That is, in the case where there are the warehouses 100 not set as process target warehouses in the fourth loop process among the warehouses 100 belonging to the process target groups, the first control unit 156 sets one of the warehouses 100 not set as the process target warehouses as the process target warehouse in the fourth loop process. In the case where there are no warehouses 100 not set as the process target warehouses in the fourth loop process among the warehouses 100 belonging to the process target groups, the first control unit 156 terminates the fourth loop process. As apparent from FIG. 8, the termination of the fourth loop process terminates the sub-determination process.

At S210, the criterion information acquiring unit 155 acquires the criterion information on the process target warehouses.

The criterion information is described here. The criterion information is information indicative of the adoption criteria of the setting patterns of the respective warehouses 100 and predetermined for each warehouse 100. As the criterion information, this embodiment includes first criterion information based on the total recognition count, second criterion information based on the total processing time, and third criterion information based on the total recognition count and the total processing time.

One example of the first criterion information is information indicative of the adoption of the setting pattern having the maximum total recognition count. One example of the second criterion information is information indicative of the adoption of the setting pattern having the minimum total processing time. One example of the third criterion information is information indicative of the adoption of the setting pattern having the maximum total recognition count under a condition that the total processing time is a predetermined time or less.

The criterion information is predetermined for each warehouse 100 as described above, and, for example, stored in the storage device 144 in the server 140. The criterion information acquiring unit 155 acquires the criterion information on the process target warehouse from the storage device 144.

At S211, the determining unit 154 determines the setting pattern of the process target warehouse based on the criterion information most recently acquired at S210 and the total information created at S208. The determining unit 154 associates the information indicative of the warehouse 100 as the process target warehouse with the determined setting pattern of the process target warehouse and transmits it to the information processing terminal 170 via the communication network. The information processing terminal 170 receives the information indicative of the warehouse 100 and the setting pattern corresponding to this warehouse 100, associates both, and stores it in the storage device 174 in the information processing terminal 170 and the like. The setting pattern of the process target warehouse determined at S211 is the appropriate setting pattern of the process target warehouse.

Figure 11:
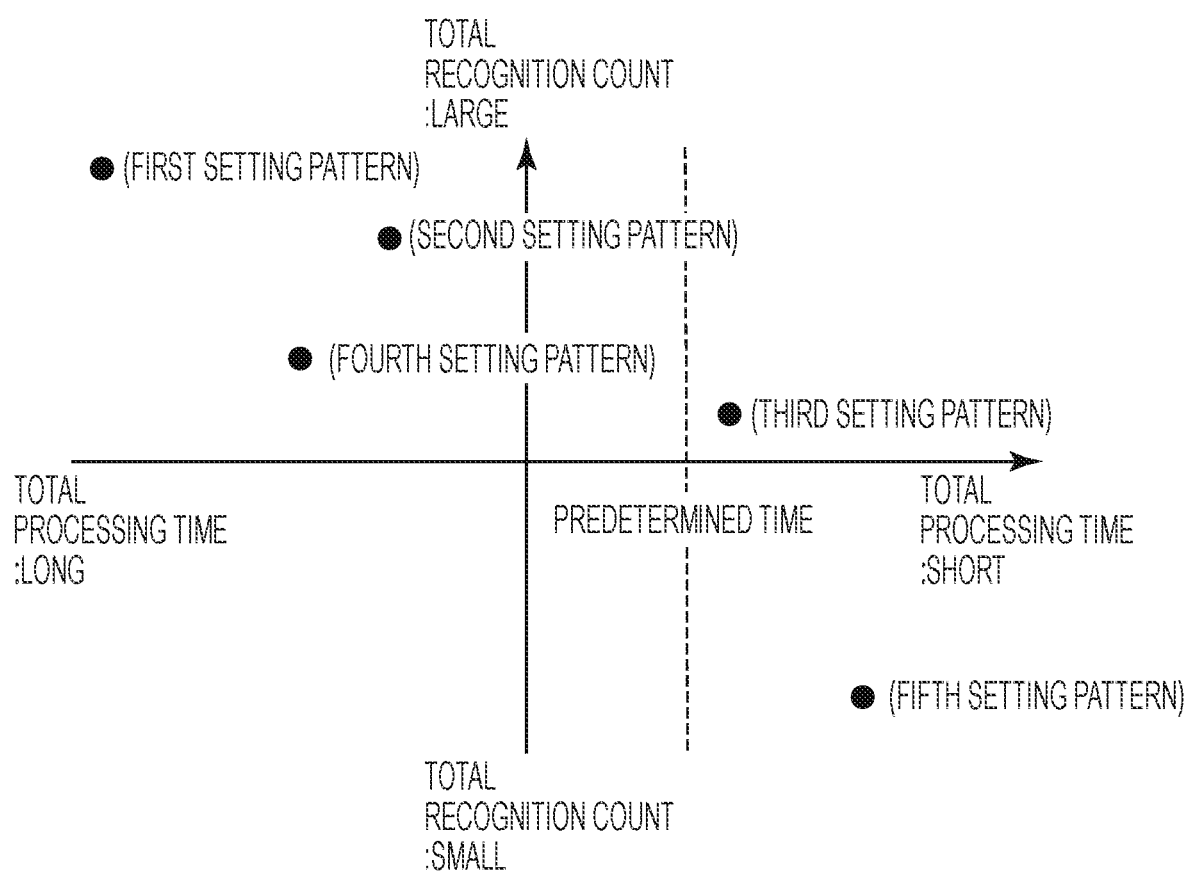
FIG. 11 is a drawing illustrating one example of a total information chart.

The following describes one example of the determination by the determining unit 154 with reference to FIG. 11. FIG. 11 is a drawing illustrating one example of the total information chart. The total information chart is a drawing plotting the total information. The horizontal axis of the total information chart indicates the total processing time and the vertical axis indicates the total recognition count. FIG. 11 illustrates an example of the five setting patterns from the first setting pattern to the fifth setting pattern as the setting patterns.

First, the following describes an example of the warehouse 100 where the criterion information is the first criterion information (the information indicative of the adoption of the setting pattern having the maximum total recognition count). As apparent from FIG. 11, the setting pattern having the maximum total recognition count is the first setting pattern. Accordingly, the determining unit 154 determines the setting pattern of the warehouse 100 where the criterion information is the first criterion information as the first setting pattern.

Next, the following describes an example of the warehouse 100 where the criterion information is the second criterion information (the information indicative of the adoption of the setting pattern having the minimum total processing time). As apparent from FIG. 11, the setting pattern having the minimum total processing time is the fifth setting pattern. Accordingly, the determining unit 154 determines the setting pattern of the warehouse 100 where the criterion information is the second criterion information as the fifth setting pattern.

Next, the following describes an example of the warehouse 100 where the criterion information is the third criterion information (the information indicative of the adoption of the setting pattern having the maximum total recognition count under the condition that the total processing time is the predetermined time or less). As apparent from FIG. 11, the setting pattern having the maximum total recognition count under the condition that the total processing time is the predetermined time or less is the third setting pattern. Accordingly, the determining unit 154 determines the setting pattern of the warehouse 100 where the criterion information is the third criterion information as the third setting pattern.

[Analysis Process in Actual Work]

Figure 12:
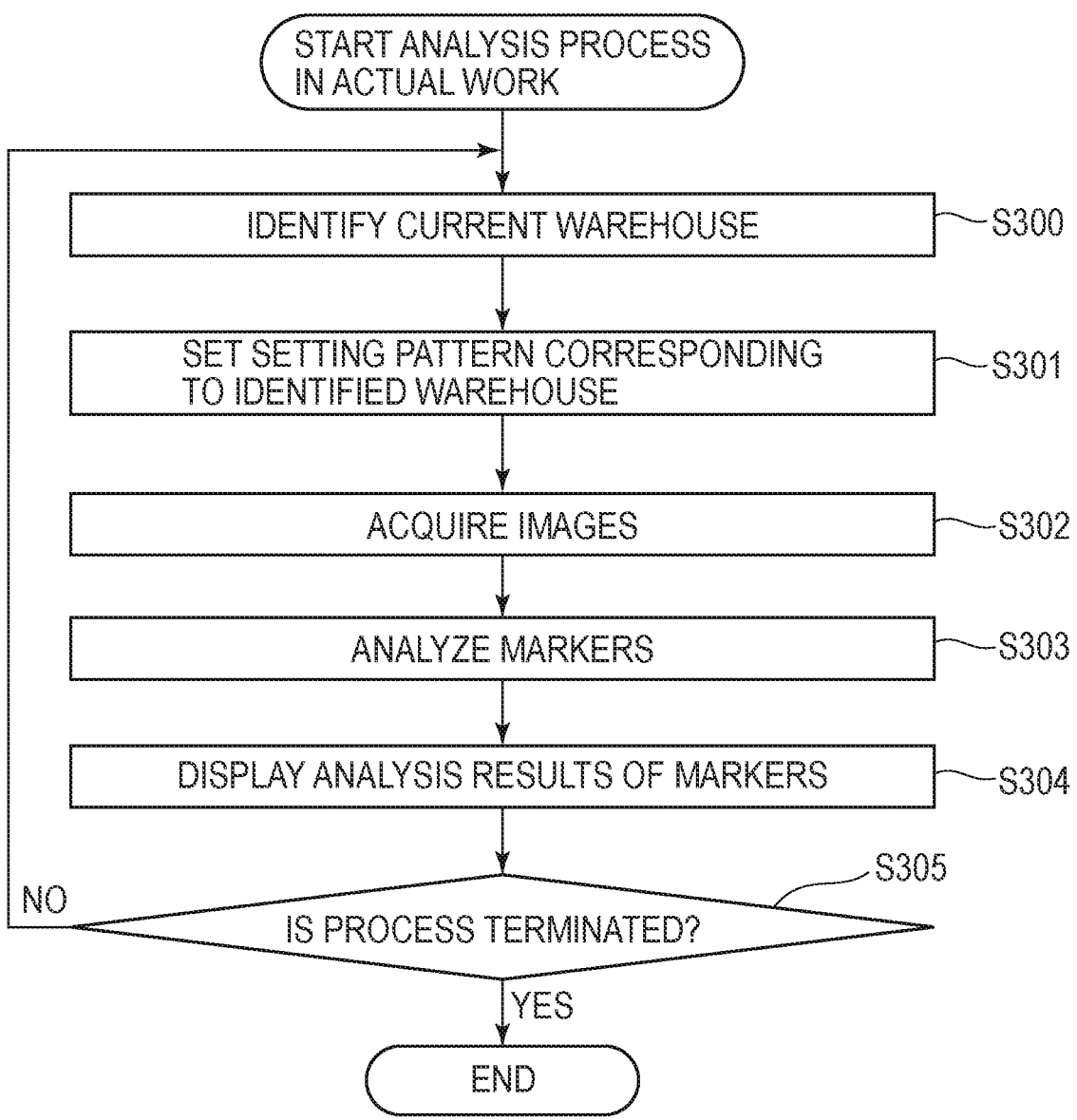
FIG. 12 is a flowchart of an analysis process in an actual work.

Next, the following describes the analysis process in the actual work with reference to FIG. 12. FIG. 12 is a flowchart of the analysis process in the actual work. The analysis process in the actual work is a process that analyzes the markers 120 from the images based on the setting pattern determined in the setting pattern determination process when, for example, the fork-lift truck 130 performs the actual work in the warehouse 100. The information processing terminal 170 executes the analysis process in the actual work. It is assumed that, prior to the analysis process in the actual work, the setting pattern determining process in FIG. 7 has been terminated.

At S300, the identifying unit 180 identifies the warehouse 100 in which the fork-lift truck 130 including the information processing terminal 170 is currently located.

The identifying unit 180 identifies the warehouse 100 where the fork-lift truck 130 is currently located, for example, as follows. That is, the identifying unit 180 identifies the warehouse 100 recorded in the warehouse marker 121 (see FIG. 1) most recently analyzed as the warehouse 100 in which the fork-lift truck 130 including the information processing terminal 170 is currently located.

The warehouse marker 121 most recently analyzed is the warehouse marker 121 analyzed from the latest image in which the warehouse marker 121 is photographed among the images acquired at S302 described later. The second analyzing unit 182 executes this analysis process at S302.

Each time the fork-lift truck 130 passes through the doorway 101, the second analyzing unit 182 analyzes the warehouse marker 121. Accordingly, the warehouse 100 in which the fork-lift truck 130 including the information processing terminal 170 is currently located can be identified from the warehouse marker 121 most recently analyzed.

The identifying unit 180 may identify the warehouse 100 in which the fork-lift truck 130 including the information processing terminal 170 is currently located by another method. For example, the information processing terminal 170 may include a GPS module, and the identifying unit 180 may identify the warehouse 100 in which the fork-lift truck 130 is currently located based on an output from the GPS module.

At S301, the second control unit 184 sets the setting pattern corresponding to the warehouse 100 most recently identified at S300. More specifically, the second control unit 184 configures a setting such that the second analyzing unit 182 analyzes the markers 120 based on the analysis setting values included in the setting pattern corresponding to the warehouse 100 most recently identified at S300.

At S302, the second image acquiring unit 181 acquires the image photographed by the photographing device 172 in the information processing terminal 170.

At S303, the second analyzing unit 182 analyzes the markers 120 from the images most recently acquired at S302 based on the analysis setting values included in the setting pattern most recently set at S301.

At S304, the display control unit 183 executes control to cause the display device 173 in the information processing terminal 170 to display the analysis screen 193.

Figure 13:
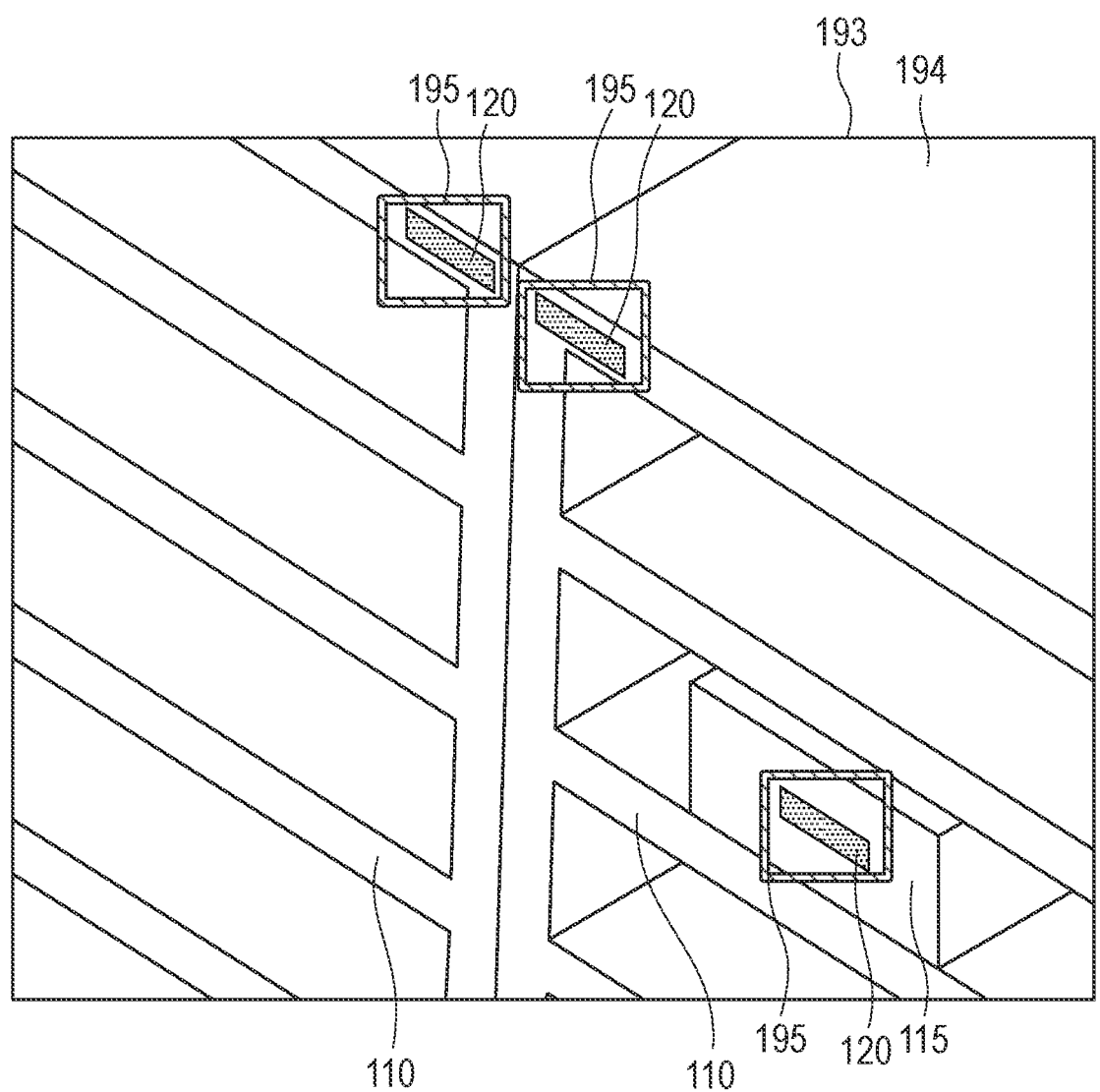
FIG. 13 is a drawing illustrating one example of an analysis screen.

Here, the following describes the analysis screen 193 with reference to FIG. 13. FIG. 13 is a drawing illustrating one example of the analysis screen 193. The analysis screen 193 is a screen that displays the analysis results of the markers 120 by the second analyzing unit 182. The analysis screen 193 displays a background image 194 and analysis frames 195.

The background image 194 is the image most recently acquired at S302 in which the shelf 110 and the like in the warehouse 100 are photographed.

The analysis frames 195 are frames surrounding the markers 120 most recently analyzed by the second analyzing unit 182 at S303. The analysis frames 195 allow the operator or similar person who views the analysis screen 193 to recognize a state of the analysis of the markers 120 by the information processing terminal 170.

At S305, the second control unit 184 determines whether to terminate the analysis process in the actual work or not. When the second control unit 184 determines the termination of the analysis process in the actual work, the analysis process in the actual work illustrated in FIG. 12 is terminated. When the second control unit 184 determines not to terminate the analysis process in the actual work, the process returns to S300. The second control unit 184 determines whether to terminate the analysis process in the actual work or not based on an operation to an input device of the information processing terminal 170 by, for example, the operator.

Effects

As described above, the creating unit 153 creates the total information based on the analysis process of the markers 120 corresponding to the setting pattern by the first analyzing unit 152 for each setting pattern. This makes properties of each setting pattern clear with the total information, thereby ensuring determining the appropriate setting pattern of the warehouse 100 based on the total information. Accordingly, for example, compared with the case where the operator of the image processing system adjusts a plurality of setting values and derives appropriate setting values, the determination of the appropriate setting values can be simplified. The adjustment of the plurality of setting values and deriving the appropriate setting values by the operator of the image processing system require an operation screen or similar device for the adjustment of the setting values by the operator. In contrast to this, the image processing system 1 of this embodiment eliminates the need for the adjustment of the setting values by the operator and eliminates the need for the operation screen or similar device for the adjustment of the setting values by the operator; therefore, a processing load to control the operating screen or similar operation is reduced.

The determining unit 154 determines the setting pattern of the warehouse 100 based on the criterion information and the total information. This eliminates the need for the operator or similar person to be involved in the determination of the setting pattern of the warehouse 100.

Additionally, the information processing terminal 170 identifies the warehouse 100 in which the fork-lift truck 130 including the information processing terminal 170 is currently located and analyzes the markers 120 from the images based on the setting pattern corresponding to the identified warehouse 100. The setting pattern corresponding to the warehouse 100 is the appropriate setting pattern of the warehouse 100 determined by the server 140. Accordingly, even when the fork-lift truck 130 moves between the warehouses 100, the analysis of the markers 120 appropriate for the warehouse 100 is executable.

Second Embodiment

Next, the following describes the image processing system 1 of this embodiment. Reference numerals identical to the above-described embodiment are used for points similar to those of the above-described embodiment, and their descriptions will be omitted.

In this embodiment, the total information for each setting pattern included in the total information list 192 includes at least any of the total recognition count, the total processing time, a weighting evaluation value, and a total false recognition count. The total recognition count and the total processing time are as already described above.

The weighting evaluation value is a summed value of the weighting values of the markers 120 analyzed in the analysis process of the markers 120 corresponding to the setting pattern. The weighting value is determined for each marker 120.

Next, the following describes the determination method for the weighting evaluation value of the first setting pattern with reference to FIG. 14. FIG. 14 is a drawing describing the determination method for the weighting evaluation value of the first setting pattern.

The values in parentheses of FIG. 14 are the weighting values of the corresponding markers 120. For example, the weighting value of the first marker 120 is 1.5, the weighting value of the second marker 120 is 1.1, and the weighting value of the 500-th marker 120 is 0.7.

The "GOOD" in FIG. 14 indicates that the first analyzing unit 152 analyzes the corresponding marker 120 from the corresponding image. For example, FIG. 14 indicates that the first analyzing unit 152 analyzes the first marker 120 and the second marker 120 from the first image. The "POOR" in FIG. 14 indicates that the first analyzing unit 152 fails to analyze the corresponding marker 120 from the corresponding image. FIG. 14 indicates that the first analyzing unit 152 fails to analyze the 500-th marker 120 from the first image.

The total weighting value of FIG. 14 is a value determined for each marker 120 expressed by "(the number of images from which the marker 120 is analyzed)×(the weighting value of the marker 120)."

For example, it is assumed that the first marker 120 is analyzed from 12 images from the first image to the L-th image. The weighting value of the first marker 120 is 1.5. At this time, the creating unit 153 determines the total weighting value of the first marker 120 as 18 through a calculation using the above-described formula "12×1.5." The creating unit 153 similarly determines the total weighting values of the other markers 120.

The creating unit 153 calculates the summed values of the total weighting values of all markers 120 illustrated in FIG. 14 and determines the summed values as the weighting evaluation values of the first setting pattern.

The creating unit 153 similarly determines the weighting evaluation values of the respective setting patterns from the second setting pattern to the N-th setting pattern.

The weighting value of the marker 120 is determined based on the type of the marker 120, the article to which the marker 120 is attached, or a distance to the marker 120.

The type of the marker 120 includes the type of the marker 120 such as the QR code and the size of the marker 120. The article to which the marker 120 is attached can be identified from the identification ID recorded in the marker 120.

The distance to the marker 120 is a distance between the photographing device 172 in the information processing terminal 170 and the marker 120 during photographing. The distance to the marker 120 can be obtained by analyzing the image in which the marker 120 is photographed and calculating a distance to the shelf 110 ahead of the photographing device 172 based on the output from the GPS module provided with the information processing terminal 170.

The various weighting values of the markers 120 are applicable in addition to the weighting value described here. For example, the weighting value may be determined based on the type of the marker 120 and the distance to the marker 120. Comparing the QR code with the color bits as the marker 120, the QR code has a difficulty in analysis at a remote distance. Therefore, when the distance to the marker 120 is longer than a predetermined distance, the weighting value of the QR code is configured smaller than the weighting value of the color bits.

The total false recognition count is the total count of the markers 120 falsely recognized in the analysis process of the markers 120 corresponding to the setting pattern.

The false recognition means cases where the identification ID recorded in the marker 120 analyzed by the first analyzing unit 152 is outside the range of the identification ID used in the warehouse 100 and the first analyzing unit 152 executes false detection at the analysis of the marker 120. For example, while a checksum and a parity code are used for the false detection, another method may be used.

The total false recognition count is determined similarly to the total recognition count. Note that, to determine the total false recognition count, instead of the number of markers 120 analyzed from the respective first image to L-th image by the first analyzing unit 152, the number of markers 120 falsely recognized from the respective first image to L-th image by the first analyzing unit 152 is used.

The criterion information used in this embodiment may include information corresponding to the total information of this embodiment. For example, when the weighting evaluation value is used as the total information, the criterion information may include the information based on the weighting evaluation value. When the total false recognition count is used as the total information, the criterion information may include information based on the total false recognition count.

The vertical axis or the horizontal axis of the total information chart illustrated in FIG. 11 may be used for the weighting evaluation value and the total false recognition count.

As described above, the total information may include the weighting evaluation value. The weighting value is determined such that the important marker 120 is recognized according to the state of the warehouse 100 and a purpose of the analysis of the markers 120 in the warehouse 100. This ensures determining the appropriate setting pattern according to the state of the warehouse 100 and the purpose of the analysis of the markers 120 in the warehouse 100

For example, assume the case where the QR codes and the color bits are used as the markers 120 in the warehouse 100. When analyzing the QR codes is important in this warehouse 100, the weighting values of the QR codes are configured to be larger than the weighting values of the color bits, thus ensuring determining the setting pattern appropriate for the analysis of the QR codes.

The total information may include the total false recognition count. Accordingly, the setting pattern so as to decrease the false recognition can be determined.

Similarly to the above-described embodiments, the determination of the appropriate setting values can be simplified.

Third Embodiment

Next, the following describes the image processing system 1 of this embodiment. Reference numerals identical to the above-described embodiments are used for points similar to those of the above-described embodiments, and their descriptions will be omitted.

Figure 15:
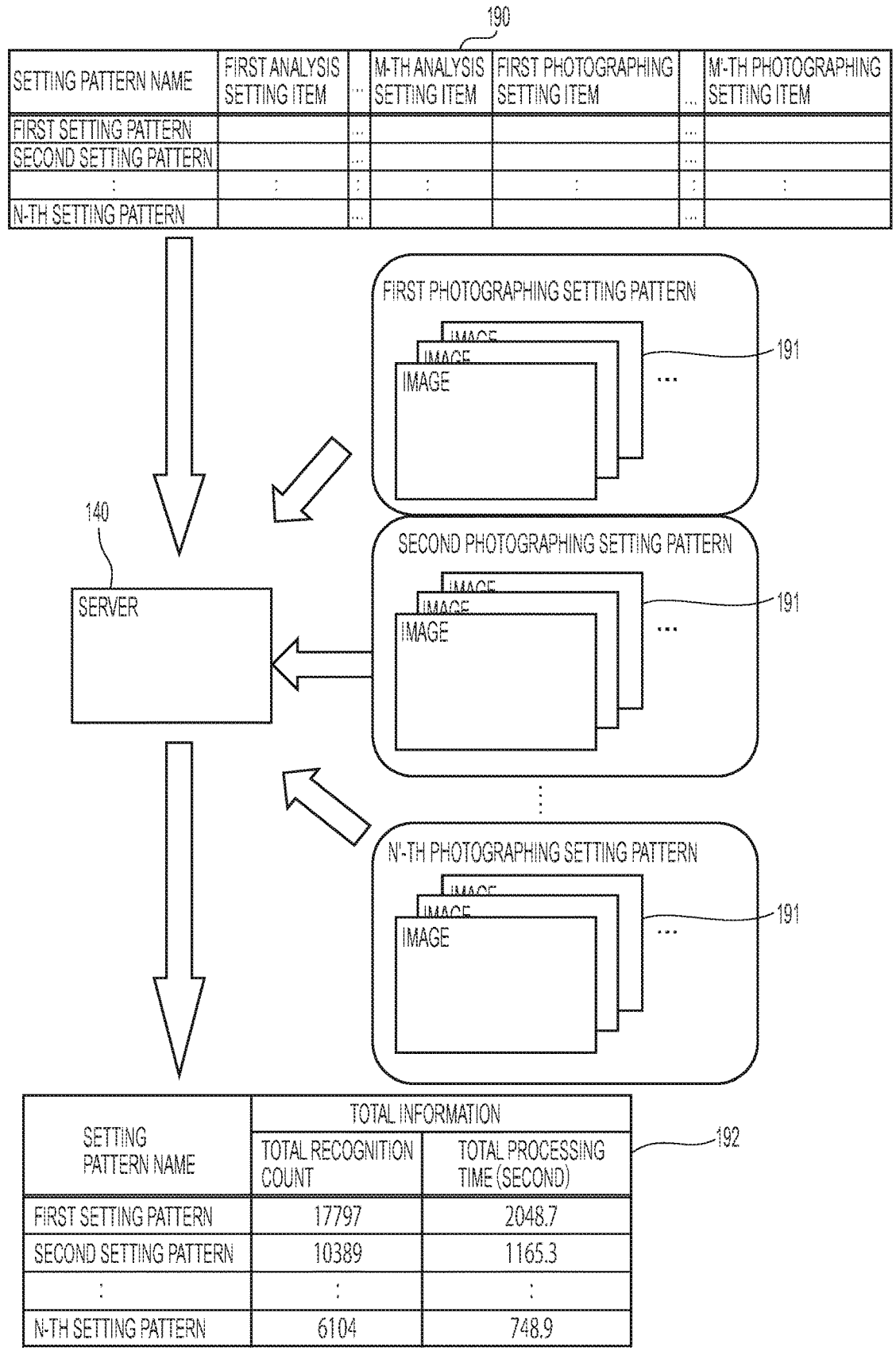
FIG. 15 is a conceptual diagram of a process that creates a total information list of a third embodiment.

First, the following describes an outline of a process that creates the total information list 192 executed in the image processing system 1 with reference to FIG. 15. FIG. 15 is a conceptual diagram of the process that creates the total information list 192. Similarly to the image processing system 1 of the above-described embodiments, the image processing system 1 of this embodiment creates the total information list 192 based on the images 191 in the warehouse 100 photographed by the information processing terminal 170 and the preliminarily prepared setting pattern list 190.

Although the setting patterns of the above-described embodiments include the analysis setting values, the setting pattern of this embodiment includes a photographing setting value in addition to the analysis setting value. The photographing setting value is a setting value regarding the photographing of the image. While the photographing setting value includes, for example, an angle of view and a focus of the lens provided with the photographing device 172 in the information processing terminal 170, the photographing setting value may be another value.

In an example of FIG. 15, the respective setting patterns include the photographing setting values from the first photographing setting value to the M'-th photographing setting value (M' is a natural number equal to or more than two). While the setting pattern includes the plurality of photographing setting values in this embodiment, the setting pattern may include only the one photographing setting value. The first photographing setting value to the M'-th photographing setting value are setting values corresponding to the respective first photographing setting item to the M'-th photographing setting item.

A photographing setting pattern list is predetermined based on the setting pattern list 190. The photographing setting pattern list includes photographing setting patterns from the first photographing setting pattern to the N'-th photographing setting pattern (N' is a natural number equal to or more than two). The respective photographing setting patterns include the first photographing setting value to the M'-th photographing setting value included in any of the setting patterns from the first setting pattern to the N-th setting pattern. Any given two photographing setting patterns from the first photographing setting pattern to the N'-th photographing setting pattern differ in at least one photographing setting value. Accordingly, the photographing setting pattern list does not include a plurality of photographing setting patterns in which all photographing setting values are identical.

The images 191 are based on a moving image in which the inside of the warehouse 100 is shot by the information processing terminal 170 prior to the actual work by the fork-lift truck 130 in the warehouse 100.

First, the information processing terminal 170 shoots the moving image applying the photographing setting values in the first photographing setting pattern by the photographing device 172 in the information processing terminal 170. Similarly, the information processing terminal 170 shoots the moving image applying the respective photographing setting values from the second photographing setting pattern to the N'-th photographing setting pattern by the photographing device 172 in the information processing terminal 170. In the photographing applying the respective photographing setting patterns, the fork-lift truck 130 is similarly moved in the warehouse 100 to be photographed.

The total information list 192 of this embodiment is the list of the total information for each setting pattern similarly to the above-described embodiments. The total information is information created for each setting pattern and information based on the analysis process of the marker 120 corresponding to the setting pattern by the first analyzing unit 152 in the server 140. For further specific description, the total information of this embodiment is information based on the analysis process of the markers 120 by the first analyzing unit 152 from the respective images photographed using the photographing setting values included in the setting patterns based on the analysis setting values included in the setting patterns.

Figure 16:
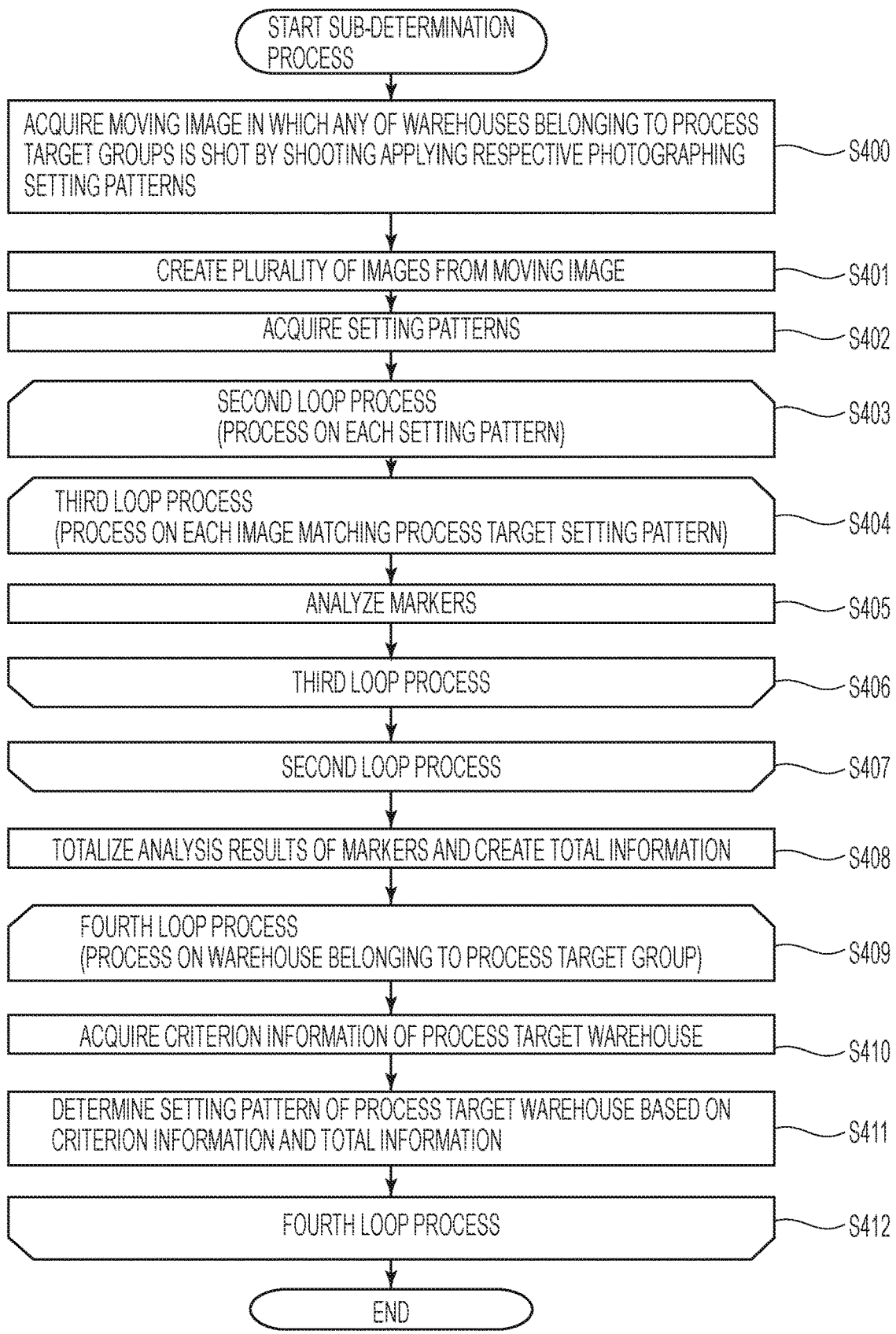
FIG. 16 is a flowchart of a sub-determination process of the third embodiment.

Next, the following describes the sub-determination process of this embodiment with reference to FIG. 16. FIG. 16 is a flowchart of the sub-determination process.

At S400, the first image acquiring unit 150 acquires the moving image in which any of the warehouses 100 belonging to the process target groups is shot by the information processing terminal 170 applying the respective photographing setting patterns from the first photographing setting pattern to the N'-th photographing setting pattern.

At S401, the first image acquiring unit 150 creates a plurality of images from the moving image acquired at S400. The images created here are still images. The images created at S401 are images of respective frames of the moving image shot by the photographing device 172 in the information processing terminal 170 and the images photographed by the photographing device 172 in the information processing terminal 170 applying any of the photographing setting patterns from the first photographing setting pattern to the N'-th photographing setting pattern.

Respective S402 and S403 are processes similar to S202 and S203 of FIG. 8.

At S404, the first control unit 156 executes the start process of the third loop process. The third loop process is a process from S404 to S406. The first control unit 156 executes the following process as the start process of the third loop process. That is, in the case where there are images not set as process target images in the third loop process at this time among the images meeting selection conditions described next, the first control unit 156 sets one of the images not set as the process target image as the process target image in the third loop process. In the case where there are no images not set as the process target images in the third loop process at this time among the plurality of images meeting the selection conditions, the first control unit 156 terminates the third loop process and advances the process to S407.

The selection conditions at S404 is that the image is the image created at S401 and is the image photographed applying the photographing setting values included in the process target setting pattern.

S405 to S407 are processes similar to S205 to S207 of FIG. 8.

At S408, the creating unit 153 totalizes the analysis results of the markers 120 by the first analyzing unit 152 and creates the total information list 192.

Here, the following describes the determination method for the total recognition count included in the total information.

First, the following describes the determination method for the total recognition count of the first setting pattern.

The creating unit 153 determines the total count of the number of markers 120 analyzed by the first analyzing unit 152 from the respective images photographed applying the photographing setting values included in the first setting pattern based on the analysis setting values included in the first setting pattern as the total recognition count of the first setting pattern.

Similarly, the creating unit 153 determines the total recognition counts of the respective setting patterns from the second setting pattern to the N-th setting pattern.

Next, the following describes the determination method for the total processing time included in the total information.

First, the following describes the determination method for the total processing time of the first setting pattern.

The creating unit 153 determines the sum of the analysis processing times of the markers 120 from the respective images photographed applying the photographing setting values included in the first setting pattern based on the analysis setting values included in the first setting pattern by the first analyzing unit 152 as the total processing time of the first setting pattern.

Similarly, the creating unit 153 determines the total processing times of the respective setting patterns from the second setting pattern to the N-th setting pattern.

S409 to S412 are processes similar to S209 to S212 of FIG. 8.

Next, the following describes the analysis process in the actual work of this embodiment. The analysis process in the actual work of this embodiment has a different process at S301 from the analysis process in the actual work of FIG. 12, and the other processes are similar to the analysis process in the actual work of FIG. 12.

At S301 of this embodiment, the second control unit 184 sets a setting pattern corresponding to the warehouse 100 most recently identified at S300. More specifically, the second control unit 184 configures the setting such that the second analyzing unit 182 analyzes the markers 120 based on the analysis setting values included in the setting pattern corresponding to the warehouse 100 most recently identified at S300.

Further, the second control unit 184 configures a setting to apply the photographing setting values included in the setting pattern corresponding to the warehouse 100 most recently identified at S300 to the photographing device 172 in the information processing terminal 170. Thus, at S302, the second image acquiring unit 181 acquires the image photographed by the photographing device 172 based on the photographing setting values applied at S301.

As described above, the setting patterns of this embodiment include the photographing setting values. Accordingly, determining the appropriate setting pattern of the warehouse 100 determines the appropriate photographing setting values of the warehouse 100. Analyzing the markers 120 from the images photographed using these photographing setting values allows analyzing the markers 120 appropriate for the warehouse 100 compared with the case where the markers 120 are analyzed from images photographed using another photographing setting value. Similarly to the above-described embodiments, determination of the appropriate setting values can be simplified.

Fourth Embodiment

Next, the following describes the image processing system 1 of this embodiment. Reference numerals identical to the above-described embodiments are used for points similar to those of the above-described embodiments, and their descriptions will be omitted. In the above-described embodiments, the determining unit 154 in the server 140 determines the setting pattern applied to the warehouse 100 based on the criterion information and the total information. Meanwhile, in this embodiment, the determining unit 154 in the server 140 determines the setting pattern applied to the warehouse 100 based on an instruction from an administrator of the image processing system 1 or similar person. The following describes this point.

First, the following describes a software configuration that achieves the functions of the server 140 of this embodiment. The server 140 further includes a server display control unit and a reception unit in addition to the respective units illustrated in FIG. 4B.

The server display control unit executes control to cause the display device 142 in the server 140 to display a total information screen. The total information screen is a screen displaying information based on the total information created by the creating unit 153 in the server 140 and, for example, a screen displaying the total information chart illustrated in FIG. 11.

The reception unit receives the selection of the setting pattern applied to each warehouse 100 based on an output signal from the input device 143 in the server 140. The determining unit 154 determines the setting pattern applied to the warehouse 100 based on the reception by the reception unit.

Next, the following describes the sub-determination process of this embodiment. The sub-determination process of this embodiment is similar to the sub-determination process of the above-described embodiments excluding points described next. The sub-determination process of this embodiment executes the following process instead of the fourth loop process of the sub-determination process of the above-described embodiments.

First, the server display control unit executes control to cause the above-described display device 142 in the server 140 to display the total information screen.

The administrator of the image processing system 1 or similar person, for example, refers to the total information screen, operates the input device 143 in the server 140, and selects the setting pattern applied to each warehouse 100 belonging to the process target group.

Next, the reception unit in the server 140 receives the selection of the setting pattern applied to each warehouse 100 based on the output signal from the input device 143 in the server 140.

Next, the determining unit 154 determines the setting pattern applied to each warehouse 100 belonging to the process target group based on the reception by the reception unit. Since this determination is based on the reception by the reception unit after the total information screen displaying the information based on the total information is displayed, it can be said that this determination is the determination based on the total information as a whole. The determining unit 154 associates the information indicative of the respective warehouses 100 with the determined setting patterns of the respective warehouses 100 and transmits it to the information processing terminal 170 via the communication network. The information processing terminal 170 receives the information indicative of the warehouse 100 and the setting pattern corresponding to this warehouse 100, associates both, and stores it in the storage device 174 in the information processing terminal 170 and the like.

As described above, the administrator of the image processing system 1 or similar person can determine the appropriate setting pattern for each warehouse 100 with reference to the total information screen. This allows the administrator of the image processing system 1 or similar person to simplify the determination on the appropriate setting pattern according to the environment of the warehouse 100.

Other Embodiments

While the above-described embodiments describe the warehouse 100 that, for example, stores the articles 115 as the example of the working environment, the working environment may be an environment where a belt conveyor is located. In this case, the articles 115 are conveyed by the belt conveyor. The information processing terminal 170 is located at a position where the articles 115 conveyed by the belt conveyor can be photographed. The server 140 can determine the appropriate setting pattern according to illuminance of the working environment, the size, the shape, the color, and the like of the article 115 conveyed by the belt conveyor. The application of the appropriate setting pattern according to the illuminance of the working environment and the articles 115 conveyed by the belt conveyor allows appropriately analyzing the markers 120 from the images.

While the shelf 110 is fixed in the above-described embodiments, the shelf 110 may be movable.

In the above-described embodiments, there is the one server 140. However, the process executed by the one server 140 of the above-described embodiments may be distributed across the plurality of servers 140.

The present invention is also achievable by the following process. A program that achieves the one or more functions of the above-described embodiments is supplied to a system or a device over a network or a storage medium. One or more processors in a computer in the system or the device reads and executes the program. Additionally, the present invention is also achievable by a circuit (for example, ASIC) that achieves the one or more functions.

While the present invention has been described with the embodiments, the above-described embodiments merely describe the specific examples to embody the present invention and therefore the technical scope of the present invention should not be limitedly interpreted. That is, the present invention can be embodied in a variety of configurations without departing from the technical idea or its main feature. The above-described embodiments may be embodied in any given combination.

The invention claimed is:

1. An information processing device comprising:
a memory;
a central processing unit (CPU) coupled to the memory and that:
acquires a plurality of images in which a working environment is photographed;
acquires a plurality of setting patterns including analysis setting values, the analysis setting values being setting values regarding an analysis of markers photographed in the images;
analyzes the markers from the respective images acquired based on the analysis setting values, the analysis setting values being included in the plurality of respective setting patterns acquired; and
creates total information for each of the setting patterns, the total information being based on an analysis process of the markers corresponding to the setting patterns.

2. The information processing device according to claim 1, wherein
the setting patterns further include photographing setting values, and the photographing setting values are setting values regarding the photographing of the images,
the CPU acquires the plurality of images photographed using the photographing setting values included in the plurality of respective setting patterns acquired, and
the analysis process of the markers corresponding to the setting patterns is the analysis process of the markers from the respective images photographed applying the photographing setting values included in the setting patterns based on the analysis setting values included in the setting patterns.

3. The information processing device according to claim 1, wherein
the total information includes at least any of a total recognition count and a total processing time,
the total recognition count is a total count of the markers analyzed by the analysis process of the markers corresponding to the setting patterns, and
the total processing time is a sum of processing times of the analysis process of the markers corresponding to the setting patterns.

4. The information processing device according to claim 1, wherein
the total information includes a weighting evaluation value,
the weighting evaluation value is a summed value of weighting values of the markers analyzed by the analysis process of the markers corresponding to the setting patterns, and
the weighting values are values determined for the respective markers.

5. The information processing device according to claim 4, wherein
the weighting values are values determined based on types of the markers, articles to which the markers are attached, or distances to the markers, and
the distances to the markers are distances between a photographing unit and the markers at the photographing, and the photographing unit is configured to photograph the images.

6. The information processing device according to claim 1, wherein
the total information includes a total false recognition count, and
the total false recognition count is a total count of the markers falsely recognized in the analysis process of the markers corresponding to the setting patterns.

7. The information processing device according to claim 1, wherein the CPU determines the setting pattern applied to the working environment based on the total information.

8. The information processing device according to claim 7, wherein
the CPU acquires criterion information indicating an adoption criterion of the setting pattern of the working environment, and determines the setting pattern applied to the working environment based on the criterion information and the total information.

9. The information processing device according to claim 7, wherein
the CPU controls to display information based on the total information, receives a selection of any of the setting patterns, and determines the setting pattern applied to the working environment based on the selection received.

10. The information processing device according to claim 1, wherein
the working environments are plural,
the working environments are preliminarily classified into any of working environment groups,
the CPU acquires the plurality of images in which any of the working environments included in the working environment groups is photographed for each of the working environment groups, analyzes the markers from the respective images acquired based on the analysis setting values included in the plurality of respective setting patterns acquired for each of the working environment groups, and creates the total information for each of the working environment groups and for each of the setting patterns.

11. A system comprising:
a first memory;
a first central processing unit (CPU) coupled to the first memory and that:
  acquires a plurality of images in which a working environment is photographed;
  acquires a plurality of setting patterns including analysis setting values, the analysis setting values being setting values regarding an analysis of markers photographed in the images;
  analyzes the markers from the respective images acquired based on the analysis setting values, the analysis setting values being included in the plurality of respective setting patterns acquired;
  creates total information for each of the setting patterns, the total information being based on an analysis process of the markers corresponding to the setting patterns; and
  determines the setting pattern applied to the working environment based on the total information;
a photographing unit mounted to a moving body;
a second memory; and
a second central processing unit (CPU) coupled to the second memory and that analyzes the markers from an image photographed by the photographing unit based on the analysis setting values included in the setting pattern determined by first CPU.

12. The system according to claim 11, wherein
the working environments are plural,
the working environments are preliminarily classified into any of working environment groups,
the first CPU acquires the plurality of images in which any of the working environments included in the working environment groups is photographed for each of the working environment groups, analyzes the markers from the respective images acquired based on the analysis setting values included in the plurality of respective setting patterns acquired for each of the working environment groups, creates the total information based on the analysis process of the markers corresponding to the setting patterns for each of the working environment groups and for each of the setting patterns, and determines the setting patterns applied to the working environments for each of the working environments, and
the second CPU identifies the working environment in which the moving body is located, and analyzes the markers from the image photographed by the photographing unit based on the analysis setting values included in the setting patterns determined by the first CPU for the working environment identified.

13. An information processing method executed by the central processing unit (CPU), the information processing method comprising:
a first acquiring step of acquiring a plurality of images in which a working environment is photographed;
a second acquiring step of acquiring a plurality of setting patterns including analysis setting values, the analysis setting values being setting values regarding an analysis of markers photographed in the images;
an analyzing step of analyzing the markers from the respective images acquired by the first acquiring step based on the analysis setting values, the analysis setting values being included in the plurality of respective setting patterns acquired by the second acquiring step; and
a creating step of creating total information for each of the setting patterns, the total information being based on an analysis process of the markers corresponding to the setting patterns by the analyzing step.

14. A computer program product comprising a non-transitory computer readable medium encoded with an information processing program for use in an information processing device, the program when executed performing the operations comprising:
causing a computer to function as respective components of the information processing device according to claim 1.

* * * * *